Nov. 24, 1964
P. G. PRIAROGGIA ETAL 3,158,681
PROCESS FOR THE ANCHORAGE OF ARMORED CABLES
AND CABLE LINE OBTAINED THEREFROM
Filed Nov. 7, 1961
2 Sheets-Sheet 1
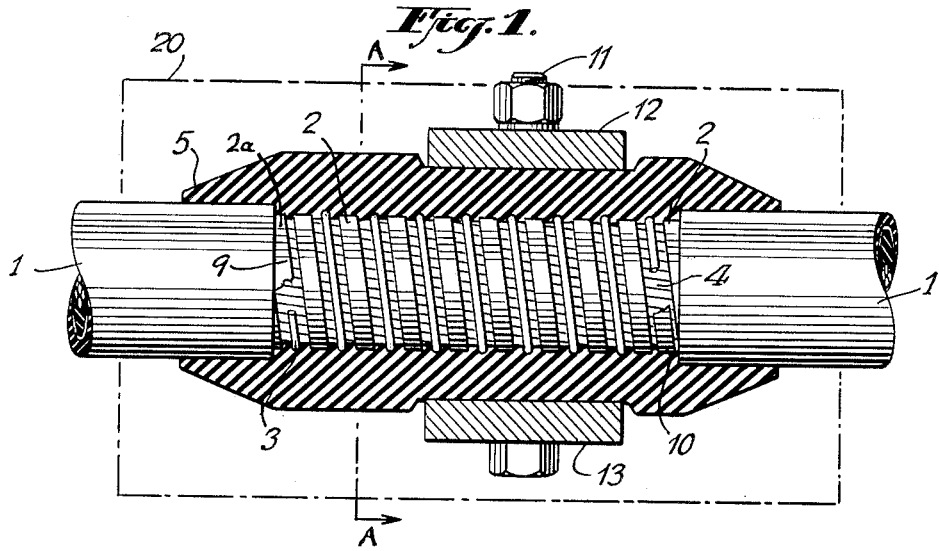
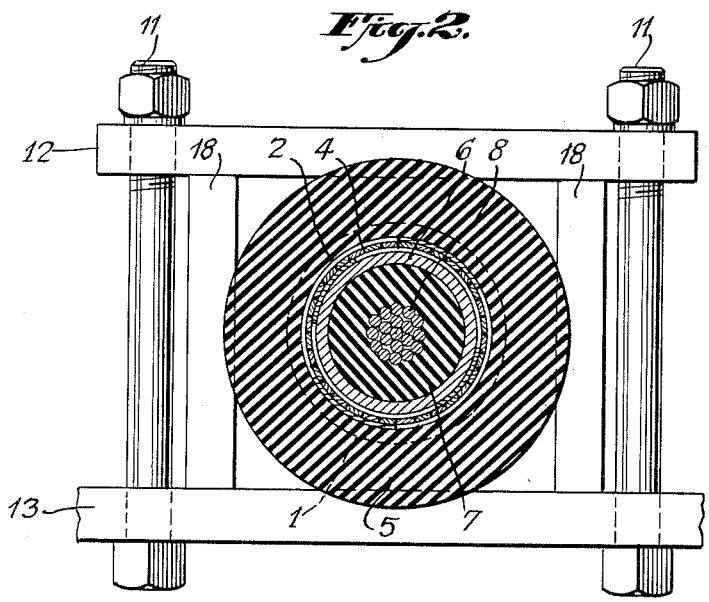
INVENTORS.
PAOLO GAZZANA PRIAROGGIA.
NICOLA PALMIERI.
BY
Ward, Neal, Haselton, Orme & McElhannon
ATTORNEYS.

Nov. 24, 1964   P. G. PRIAROGGIA ET AL   3,158,681
PROCESS FOR THE ANCHORAGE OF ARMORED CABLES
AND CABLE LINE OBTAINED THEREFROM
Filed Nov. 7, 1961                              2 Sheets-Sheet 2
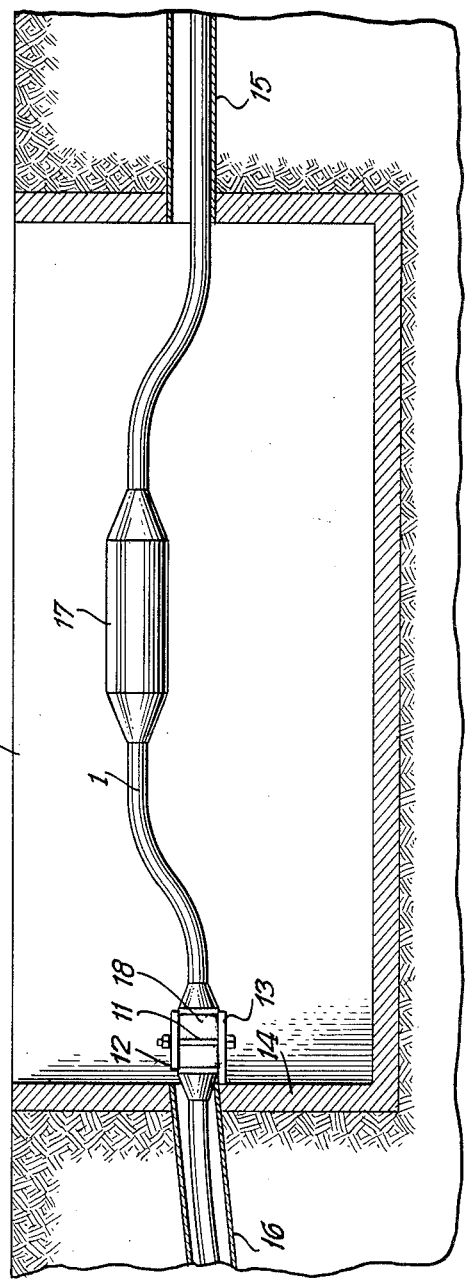
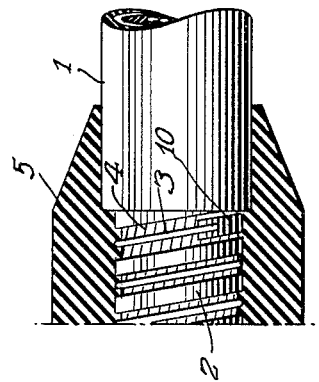
INVENTORS.
PAOLO GAZZANA PRIAROGGIA.
NICOLA PALMIERI.
BY
Ward, Neal, Haselton, Orme & McElhannon
ATTORNEYS.

United States Patent Office 3,158,681
Patented Nov. 24, 1964

3,158,681
PROCESS FOR THE ANCHORAGE OF ARMORED CABLES AND CABLE LINE OBTAINED THEREFROM
Paolo Gazzana Priaroggia and Nicola Palmieri, Milan, Italy, assignors to Pirelli Società per Azioni, Milan, Italy, a corporation of Italy
Filed Nov. 7, 1961, Ser. No. 150,788
Claims priority, application Italy Nov. 15, 1960
9 Claims. (Cl. 174—135)

The present invention relates to a process for the anchoring of armored cables laid in conduits and to the cable line obtained according to said process.

In the cables laid in underground conduits, there may be sometimes the need of overcoming the problems of slope sections, and therefore the cable to be laid in said sections must possess particular features. In fact, it is often reinforced with a longitudinal armor able to withstand the mechanical stresses originated by its installation at a slope, and this first armor is then covered with an additional transverse armor which has also the task of retaining the first longitudinal armor and to increase its compactness. The above indicated armors are arranged about the metal sheath which covers the cable core.

The longitudinal armor is obtained by means of a taping of several metal strips helically wound about the metal sheath of the cable at a very long or coarse pitch and therefore at a very small angle of inclination with respect to the cable axis.

The transverse armor is obtained instead by means of one or two metal strips, helically wound at a very short or fine pitch and therefore at a very large angle of inclination with respect to the cable axis.

The armored cable is then generally sheathed with a protective sheath of thermoplastic material, for instance polyethylene or polyvinyl chloride.

The anchorages are usually made in proximity to the joints between two cable lengths, but they can be situated in intermediate lengths. The need of providing an anchorage corresponding to each joint is particularly felt, as, in order to make the joints, the armor must be interrupted and the strips constituting the armor itself must be soldered to the underlying metal sheath in order to prevent their unwinding. Therefore, the presence of an anchorage to absorb the cable stresses is indispensable.

In fact, when the anchorage is lacking, the weight of the cable would stress, in a dangerous way, the joining zone where, as already stated, the armor has been interrupted, and moreover, there would be the possibility of ruptures of the metal sheath of the cable just in that zone.

The operations necessary to construct the joint and to prepare the anchorages are carried out at the installation site during the laying of the cable itself; nevertheless, the cable portion corresponding to the length involved in the construction of the anchorage can be prepared in the factory.

In order to facilitate the operations used in the construction of the joints and of the anchorages, it is the common practice to provide a small underground masonry chamber, in which these operations can be easily carried out and in which the joint and the anchorage remain located.

A feature which the anchorages must very often possess is that they must not only be able to insure a safe fastening of the armor to the masonry of the chamber, but also, at the same time, must insure electric insulation between the cable sheath, generally constituted by lead or aluminum, and the ground.

With regard to the cable, the problem of the insulation is already solved because, as already stated, the armored cable is always covered with a sheath of material having insulating characteristics. Said problem becomes, however, more complex when the insulation of the anchorage from the ground must be obtained. In fact, at the anchorage, the sheath of thermoplastic material must be removed to allow access to the underlying armor, which must be firmly anchored to the masonry. If suitable measures are not taken, there is the danger of earthing the armor and consequently the underlying metal sheath just at the anchorage, while in this zone a good insulation from the ground also must be insured.

In the common practice the anchorage is prepared by using insulating materials, for example, impregnated wood or phenol resin materials sold on the market under the trademark "Bakelite," which are used to form dowels to be firmly fixed in the masonry of the chamber.

Subsequently, by means of metallic elements, for example, tie rods, threaded bars, collars, metal tapes, etc., a strong connection is carried out between the armor and the dowels of insulating material. In this way the cable is anchored to the masonry without resorting to the direct contact of the metallic parts with the masonry itself, and also a certain degree of insulation from the masonry is insured by virtue of the use of the dowels of insulating material.

This construction has, however, several disadvantages: first of all there is the serious inconvenience that the insulation provided by the aforementioned dowels of insulating material cannot be considered as quite constant in course of time, owing to the possible moisture absorption by part of said insulating dowels; secondly the parts intended to constitute the anchorage are many and have different shapes, so that it is necessary to employ particularly skilled labor for its construction.

The present invention aims at providing a process for carrying out the anchorage in the proximity of joints for armored cables laid in conduits, and a cable line so obtained in which the above described inconveniences are eliminated and at the same time the perfect electric insulation of the metal sheath of the cable from the ground is insured.

The preferred process is characterized in that it comprises the following operations:

(a) The insulating protective sheath covering the armor is removed for a certain length from the zone designed for the anchorage in order to bare the underlying transverse armor;

(b) The bared transverse armor is at least partially removed and its free ends are fastened to the underlying longitudinal armor in order to prevent its unwinding;

(c) An anchoring wire, preferably having a thickness greater than the thickness of the transverse armor strips when such strips are relatively thin, is helically wound about the longitudinal armor in the portion deprived of the transverse armor and is secured to the underlying longitudinal armor such as by spot-welding;

(d) A mold having such a longitudinal size as to cover a part of the two ends of the protective sheath bounding the zone where the armor has been rendered accessible is disposed about the zone designed for the anchorage;

(e) A thermosetting synthetic resin is poured into the mold, and when the resin has polymerized, the mold is removed;

(f) The sleeve of synthetic resin so obtained is fastened and locked to the walls of the masonry chamber by means of brackets or other known equivalent elements.

A further object of the present invention is a cable line obtained by means of the above described process, and is characterized in that it comprises one or more sleeves of insulating and thermosetting synthetic resin anchored to the ground with known means, each of which sleeves intimately and continuously adheres to the longitudinal armor of the cable in the portion deprived of the insulating sheath of thermoplastic resin for a length smaller than the length of the sleeve and also deprived of the transverse armor which is at least partially replaced with a helically wound wire fastened to the longitudinal armor by welding or brazing.

Further details of the present invention will be better understood from the following description, given by way of illustrative example, which description should be considered in conjunction with the accompanying drawings, in which:

FIG. 1 is a side elevation view, partly in cross-section of a preferred embodiment of an anchorage of the invention;

FIG. 2 is a cross-sectional view of the embodiment shown in FIG. 1 and is taken along the line A—A indicated in FIG. 1;

FIG. 3 is a schematic, side elevation view of an anchorage and a joint in a masonry chamber; and FIG. 4 is a fragmentary, side elevation view, partly in cross-section of a modified form of the invention.

To build up the anchorage, it is first of all necessary to remove the outer insulating sheath 1 of the cable for a length shorter than the length of the mold, schematically illustrated by the dotted lines 20 into which the synthetic resin will be poured. As the synthetic resin sleeve 5 must adhere directly to the longitudinal armor 4, care must be taken to provide the greatest adherence between the two surfaces in contact in order to prevent a possible mutual sliding. For this purpose the transverse armor is removed as the metal strip thereof does not afford a sufficient adhesion, and a wire 3 having preferably a diameter of about one mm. is substituted for at least a portion of the transverse armor and is helically wound about the longitudinal armor 4 and fastened to it such as by spot-welding. There is in this way the advantage that the sleeve 5 surrounds the bared cable zone and is closely adherent to it.

In the embodiment represented in FIG. 1 in which the transverse armor is formed of two strips 2 and 2a, it is sufficient to remove one strip only. The reference numerals 9 and 10 indicate the extremities of the tape or strip 2a at opposite ends of the zone where a portion of one of the two strips constituting the transverse armor has been removed.

As shown in FIG. 2, the longitudinal armor 4 surrounds the metal sheath 6 which, in turn, covers the insulation 7 surrounding the stranded conductor 8.

The ends 9 and 10 of the strip 2a are welded or brazed to the longitudinal armor 4 in order to avoid the possibility that the strip 2a may unwind or get loose. At a short distance from said ends, there begins the winding of wire 3 (for instance of copper) which is made integral with the longitudinal armor, preferably by spot-welding at several points.

As an alternative the ends of the wire 3 may be directly fastened to the ends 9 and 10 terminating the transverse armor such as by welding or brazing, as shown in FIG. 4. In this case, the fastening of the ends 9 and 10 to the longitudinal armor is unnecessary as the wire 3, secured to said ends, has a mechanical resistance sufficient to prevent the slackening of the transverse armor interrupted in the anchorage zone.

If the strip 2 is left on the longitudinal armor 4 and if it has sufficient thickness to provide the desired resistance to longitudinal movement of the sleeve 5, the strip 2 may be secured to the longitudinal armor 4, such as by welding or brazing, and the wire 3 may be omitted. However, the strips 2 and 2a forming the transverse armor usually are relatively thin and the wire 3 generally is required.

Subsequently, the mold 20 of conventional construction and generally composed of two separable parts in order to facilitate its arrangement about the zone and its removal at the end of the operation, is placed in the correct position and a thermosetting synthetic resin is poured into it. The resin is preferably of the ethoxylinic type, for instance, the one sold on the market under the trade name of "Araldit" or "Araldite," and sets without external heating. Such resin may be loaded with inorganic excipients, for instance, quartz or caolin powder, and contains suitable hardening agents. The poured resin is then allowed to polymerize and finally the mold is removed.

The mold where the resin is poured is suitably shaped in such a way that the outer surface of the resin sleeve has a particular profile such as that shown in FIG. 1, and will facilitate the anchorage of the sleeve to the walls of the chamber by means of suitable collars and metallic tie rods. In FIG. 1 the reference numeral 11 indicates the tie rods which fasten the cross beam 12 to a bracket 13 secured to the chamber masonry.

FIG. 3 represents the disposition of a joint and of an anchorage in the masonry chamber. In this figure, reference numeral 14 indicates the masonry constituting the chamber, 15 and 16 designates the inlet and outlet conduits, and 17 designates the joint which is kept in the stated position with known means, not shown in the figure for the sake of simplicity.

At the beginning of the outlet conduit 16 there is the anchorage device. As illustrated, the sleeve of synthetic resin is firmly secured to the bracket 13 integral with the masonry 14. The rigid mechanical connection between the sleeve and the bracket is obtained through the tie rods 11 which connect the cross beam 12 to the bracket 13. This mechanical connection is completed by two lateral cramping tables or shaped plates 18 (also shown in FIG. 2), having the purpose of preventing any transverse motion of the device, only one table 18 being visible in FIG. 3. As stated, the outer surface of the sleeve is so shaped that both the cross beam 12 and the lateral cramping tables 18, and the bracket 13 fit with its profile, thus insuring the perfect rigidity of the whole assembly. When the anchorage device has been positioned, the upper part 19 of the masonry chamber is closed with suitable means in order to avoid the penetration of dust from the outside.

By virtue of the fact that the resin intimately adheres to the surfaces with which it comes into contact, the complete imperviousness of the anchorage to moisture is always insured even if water penetrates into the chamber. Moreover, the sleeve can be applied to any type of armored cable and its application does not involve particular difficulties. As already stated, it is substantially integral with the longitudinal armor of the cable, so that the cable is firmly and safely fastened to the ground. Moreover, the armor and the underlying metal sheath are perfectly insulated from the ground at each point and the insulation remains constant with time and without suffering any modification.

It is understood that the process forming the subject matter of the present invention represents a non-limiting example of a preferred embodiment of the invention, so that the represented constructional realizations can be varied without departing from the principle of the invention itself.

Having thus described our invention with particular reference to the preferred form thereof and having shown and described certain modifications, it will be obvious to those skilled in the art to which the invention pertains, after understanding our invention, that various changes and other modifications may be made therein without departing from the spirit and scope of our invention, as defined by the claims appended thereto.

What is claimed as new and desired to be secured by Letters Patent is:

1. A method for manufacturing an anchorage for an armored cable comprising an inner armor layer, an outer armor layer surrounding said inner layer and an insulating sheath surrounding said outer layer, said method comprising:

removing a predetermined length of said sheath at the zone of the cable to be anchored, removing a portion of said outer layer at said zone to expose a portion of said inner layer, securing at least the ends of the outer layer adjacent opposite ends of said zone to said inner layer, and molding a sleeve of a thermosetting synthetic resin around said layer in said zone and around portions of said sheath at the ends of said zone.

2. A method for manufacturing an anchorage for an armored cable comprising an inner armor layer, an outer armor layer surrounding said inner layer and an insulating sheath surrounding said outer layer, said method comprising:

removing a predetermined length of said sheath at the zone of the cable to be anchored, removing at least a portion of said outer layer at said zone to expose a portion of said inner layer, winding a layer of spaced turns of wire around and in contact with the exposed portion of said inner layer and securing said wire to said inner layer, securing the ends of the outer layer adjacent opposite ends of said zone to one of said inner and wire layers, and molding a sleeve of a thermosetting synthetic resin around said layer in said zone and around portions of said sheath at the ends of said zone.

3. A method for manufacturing an anchorage for an armored cable comprising an inner armor layer, an outer armor layer surrounding said inner layer and an insulating sheath surrounding said outer layer, said method comprising:

removing a predetermined length of said sheath at the zone of the cable to be anchored, removing at least a portion of said outer layer at said zone to expose a portion of said inner layer, winding a layer of spaced turns of wire around and in contact with the exposed portion of said inner layer and securing said wire to said inner layer, securing the ends of the outer layer adjacent opposite ends of said zone to said inner layer, and molding a sleeve of a thermosetting synthetic resin around said layer in said zone and around portions of said sheath at the ends of said zone.

4. A method for manufacturing an anchorage for an armored cable comprising an inner armor layer, an outer armor layer surrounding said inner layer and an insulating sheath surrounding said outer layer, said method comprising:

removing a predetermined length of said sheath at the zone of the cable to be anchored, removing at least a portion of said outer layer at said zone to expose a portion of said inner layer, winding a layer of spaced turns of wire around and in contact with the exposed portion of said inner layer, securing the ends of the outer layer adjacent opposite ends of said zone to the ends of said wire layer, and molding a sleeve of a thermosetting synthetic resin around said layer in said zone and around portions of said sheath at the ends of said zone.

5. An anchorage for an armored cable comprising inner and outer armor layers and an insulating sheath surrounding said armor layers, said sheath terminating at opposite ends of a predetermined zone of said cable and said outer armor layer being interrupted in said zone but said zone having spaced turns of metal secured to said inner layer in the space between the ends of said sheath, and said anchorage comprising a sleeve of thermosetting resin bonded to said inner layer, surrounding said turns and extending over and surrounding said ends of said sheath.

6. An anchorage as set forth in claim 5 wherein said turns are turns of wire replacing turns of said outer armor layer.

7. An anchorage as set forth in claim 5 wherein said resin comprises an ethoxylinic resin.

8. An anchorage as set forth in claim 5 wherein said resin comprises an ethoxylinic resin containing inorganic materials.

9. An anchorage as set forth in claim 5 wherein said anchorage comprises a bracket secured to the exterior of said sleeve.

References Cited in the file of this patent

UNITED STATES PATENTS

| 2,898,396 | Watson | Aug. 4, 1959 |
| 2,950,338 | Taylor | Aug. 23, 1960 |
| 3,000,848 | McGary et al. | Sept. 19, 1961 |

FOREIGN PATENTS

| 175,198 | Sweden | May 2, 1961 |